May 30, 1961 W. M. SHAFFER 2,986,295
NARROW AISLE WAREHOUSING LIFT TRUCK
Filed Nov. 25, 1957 10 Sheets-Sheet 3

INVENTOR.
WALTER M. SHAFFER
BY
RICHEY, WATTS, EDGERTON,
McNENNY & FARRINGTON
Donald W. Farrington
ATTORNEYS

May 30, 1961 W. M. SHAFFER 2,986,295
NARROW AISLE WAREHOUSING LIFT TRUCK
Filed Nov. 25, 1957 10 Sheets-Sheet 6

Fig. 8

INVENTOR.
WALTER M. SHAFFER
BY
RICHEY, WATTS, EDGERTON,
McNENNY & FARRINGTON
Donald W. Farrington
ATTORNEYS May 30, 1961 W. M. SHAFFER 2,986,295
NARROW AISLE WAREHOUSING LIFT TRUCK
Filed Nov. 25, 1957 10 Sheets-Sheet 7

INVENTOR.
WALTER M. SHAFFER
BY
RICHEY, WATTS, EDGERTON,
McNENNY & FARRINGTON
Donald W. Farrington
ATTORNEYS

Fig. 9

INVENTOR.
WALTER M. SHAFFER
BY
RICHEY, WATTS, EDGERTON,
McNENNY & FARRINGTON
ATTORNEYS

May 30, 1961  W. M. SHAFFER  2,986,295
NARROW AISLE WAREHOUSING LIFT TRUCK
Filed Nov. 25, 1957  10 Sheets-Sheet 10

Fig. 16

INVENTOR.
WALTER M. SHAFFER
BY
RICHEY, WATTS, EDGERTON,
McNENNY & FARRINGTON
ATTORNEYS

United States Patent Office 2,986,295
Patented May 30, 1961

2,986,295

NARROW AISLE WAREHOUSING LIFT TRUCK

Walter M. Shaffer, Chesterland, Ohio., assignor to Towmotor Corporation, Cleveland, Ohio, a corporation of Ohio Filed Nov. 25, 1957, Ser. No. 698,663

9 Claims. (Cl. 214—730)

This invention relates to industrial truck apparatus and more particularly to fluid control systems for actuating and operating power components of the truck apparatus in response to manual and automatic signals to effect speed, direction and other controls of the truck apparatus in operation of the same in narrow aisles and confined spaces.

Broadly stated, this invention comprehends the provision of an industrial truck apparatus with a dirigible load carriage cooperable with a pair of outrigger wheels selectively extendable laterally to increase the transverse stability of the truck. A pair of variable displacement fluid motors are individually geared to respective drive wheels of the truck for directional control of the load carriage, and control valve apparatus including manually positionable valves for extending the desired outrigger wheels and directing fluid to the motors in forward or reverse directions at variable volumes for varying the speed of the same and further valve control means for controlling the displacement of the motors under certain conditions of operation wherein the motors operate as pumps by being driven by the truck drive wheel are provided.

In the past, various expedients have been devised for enabling operation of industrial lift trucks in confined spaces for a more efficient use of storage space in warehouses and the like. However, in accomplishing this end, the prior trucks required sufficient aisle width to enable the truck to be bodily maneuvered and longitudinally aligned and directed into a space for receiving or delivering a load or alternatively, the fork of the truck was pivotal with respect to the truck body to facilitate direction into loading and unloading spaces. In the latter mentioned arrangements, the weight of the load and the pivot angle of the load with respect to the truck body was greatly limited in that the transverse stability of the truck was limited by the relatively narrow transverse wheel bases. According to another prior art arrangement for facilitating handling of loads in relatively narrow aisles a short stacker truck expressly for use in a narrow aisle is provided for handling a load only in the immediate vicinity of the aisle. Since such stacker trucks are electrically powered and slow in movement, it has been found advantageous to bring a load to the vicinity of the stacker by a conventional lift truck, transfer the load to the stacker and then dispose the load appropriately by the stacker. As may be readily understood such a multiple handling and transfer operation is undesirable as being time consuming, wasteful of manpower and requires the use of two trucks, each for a different purpose.

Accordingly, it is a primary object of this invention to provide an industrial lift truck that is capable of maneuvering into spaces at right angles or other angles to a narrow aisle, that is capable of performing the combined functions of conventional and stacker lift trucks of the prior art and that is not subject to the limitations of prior art lift trucks as mentioned hereinabove.

It is another object of this invention to provide an industrial lift truck that is capable of depositing or removing loads from a space adjacent to an aisle that is narrower than the combined length of the truck and load.

It is another object of this invention to provide an industrial truck having a lift fork that is pivotal about a vertical axis and at angles up to 90 degrees with respect to the truck's longitudinal axis.

It is another object of this invention to provide an industrial lift truck having a pair of outrigger wheels mounted for selectively providing lateral support for the truck at points laterally removed from the truck, in response to angular direction of the truck forks.

It is another object of this invention to provide novel control means for an industrial lift truck of the type mentioned in the last previous object wherein control means are provided for enabling extension of only the left or right outrigger arm and wheel and inherently preventing simultaneous extension of both outrigger arms and wheels.

It is another object of this invention to provide an industrial lift truck having control means effective to automatically sequentially extend an outrigger arm and wheel to either side of the truck, and to unlatch the drive wheel axle for pivotal movement thereof.

It is another object of this invention to provide novel control means for an industrial truck that automatically prevents pivotal movement of the fork thereof prior to lateral positioning of an outrigger supporting wheel at the side thereof.

It is another object of this invention to provide a novel method of operating an industrial lift truck facilitating improved operation thereof.

It is another object of this invention to provide a lift truck having drive wheels mounted on an axle pivotal for bodily turning about a central axis and a pivotal outrigger to effect an increase in the transverse support of the lift truck.

It is another object of this invention to provide a lift truck according to the last preceding object having means for sequentially extending the outrigger away from the truck body and thereafter to turn the axle to steer and move the lift truck in a short turn.

It is another object of this invention to provide a hydraulic fluid control system in an industrial truck apparatus for controlling the delivery of fluid under pressure to the truck hydraulic fluid motors at varying volumes for controlling the speed of movement of the truck.

It is another object of this invention to provide in a system of the last preceding object an automatic motor displacement control means responsive to torque requirement of the motors to appropriately adopt an optimum displacement of the truck motors.

It is another object of this invention to provide in a system according to the past preceding object, a relief flow sensing valve responsive to reverse application of fluid to the drive motors while being driven by the truck wheels to effect a minimum motor displacement preventing generation of heat and imposition of other adverse influences on the motors.

It is another object of this invention to provide a fluid control system in an industrial truck apparatus operable at relatively high fluid pressures and relatively low fluid volumes when compared with similar prior fluid systems.

It is another object of this invention to provide a fluid control system in an industrial truck apparatus having a pair of variable displacement drive motors, operable in parallel-same, series-same and series-opposing directions and a selector valve apparatus for effecting operation of the motors at maximum displacement during either series-same or series-opposing positions.

It is another object of this invention to provide a hydraulic fluid control system in an industrial truck apparatus for providing improved controllability over existing conventional drive in respect to "inching" and "creeping" operations of the truck.

It is another object of this invention to provide in a system of the last preceding object, apparatus facilitating a reverse drive of the truck without first bringing the truck to a standstill.

It is another object of this invention to provide in a system of the last preceding object means facilitating drive control of the truck as to direction and speed with one foot operated pedal linkage.

It is another object of this invention to provide in a system according to the last preceding object, apparatus including a pair of pumps enabling "creeping" and "inching" motion of the truck simultaneous with elevation of a load by the carriage thereof.

Other and further objects and advantages will appear from a more detailed description of this invention together with the accompanying drawings in which.

Figure 1:
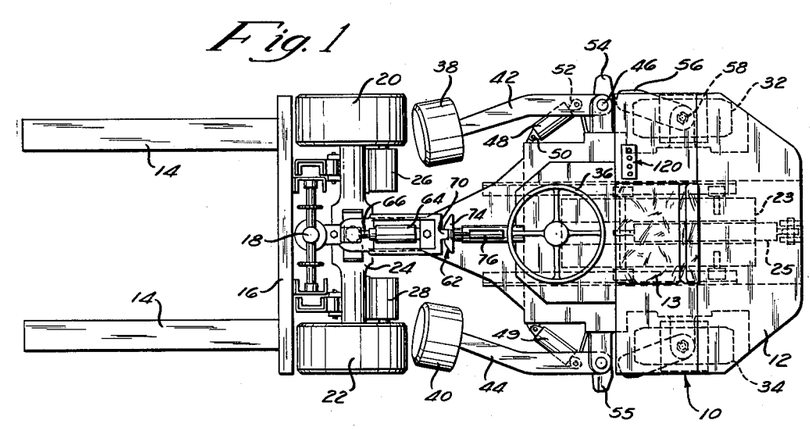
Figure 1 is a plan view of a truck according to this invention with its carriage directed forwardly and its outrigger wheels in retracted position.

Referring now more particularly to Figure 1 of the drawings, 10 represents generally an industrial lift truck having a body portion 12 for housing and mounting various components of the truck including an operator's seat 13, a lift fork having tines 14 supported by a carriage 16 and a mast 18 along which the carriage is vertically movable. A pair of drive wheels 20 and 22 mounted at respective ends of a transverse axle 24 and respective reversible drive motors 26 and 28 for selectively rotating respective drive wheels are provided and axle 24 is centrally pivotal about a vertical pivot shaft 30 shown more clearly in Figures 2, 3 and 4, mounted in a forward yoke of body 12 to provide disposition of drive wheels 20 and 22 and axle 24 at positions angularly displaced from the forward position thereof shown in solid lines in Figure 1 of the drawings. Fork tines 14 and carriage 16 are unitarily pivotal with drive wheels 20 and 22 and axle 24 for direction and movement of a load in the direction of the drive wheels.

Figures 3, 4:
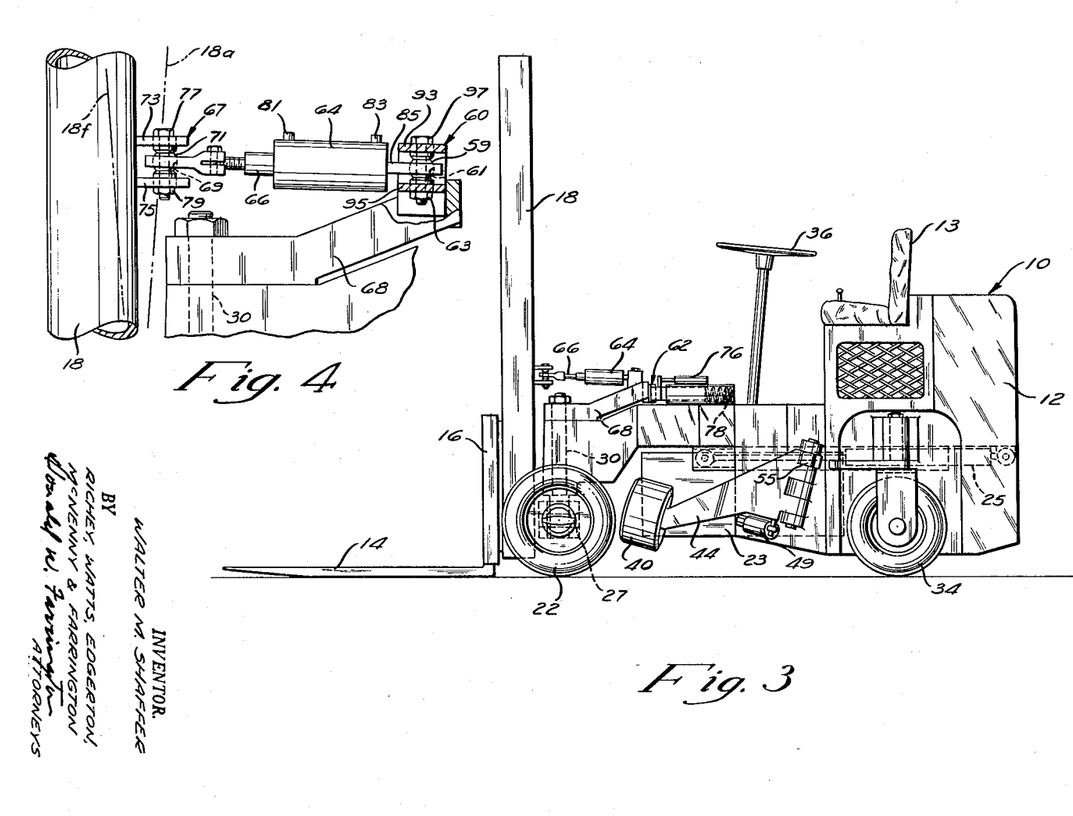
Figure 3 is a side view of the truck according to this invention with its left outrigger wheel in retracted position.
Figure 4 is a fragmentary view of the truck showing the mast tilting mechanism in detail.

As shown most clearly in Figure 3, axle 24 is also pivotal about a longitudinal, horizontally positioned shaft 27 passing through axle 24 and shaft 30 to enable tilting motion of the body of truck 10 about a horizontal axis and relative to the truck axle drive wheels and fork providing angulation between the drive and steer wheels of the truck facilitating contact of all wheels with an uneven operating surface.

Figure 5:
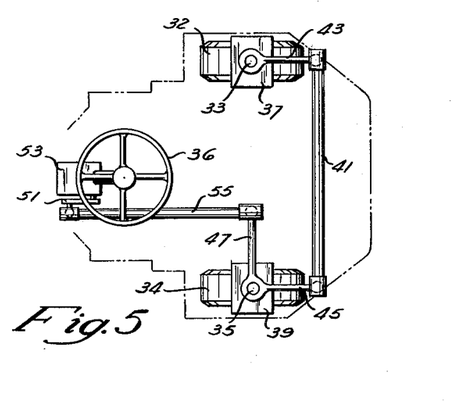
Figure 5 is a fragmentary view of the truck showing the truck steering linkage in detail.
Figure 6:
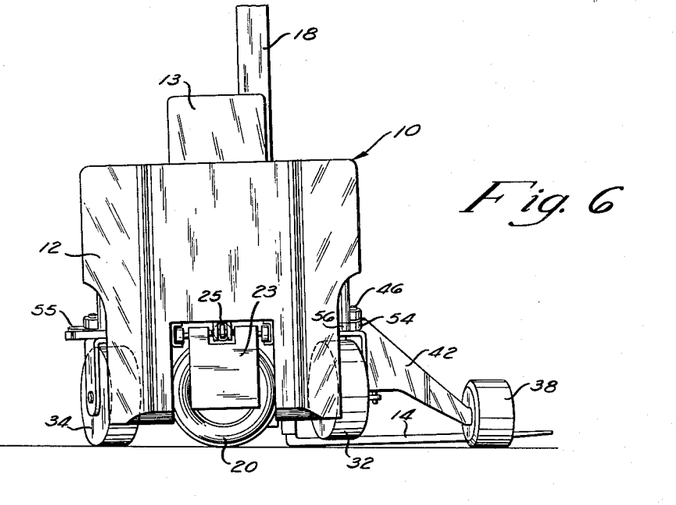
Figure 6 is a rear view of the truck with its right outoutrigger arm and wheel in extended position.

For directing movement of the truck 10, a pair of rear wheels 32 and 34 are provided and are dirigible by an operator of the truck through appropriate manipulation of a steering wheel 36, as shown more clearly in Figure 5 of the drawings. Wheels 32 and 34 are mounted on respective vertically disposed shafts 33 and 35 which are held and guided in respective blocks 37 and 39. Shafts 33 and 35 are connected to each other for unitary pivotal movement by a tie rod 41 connected between an arm 43, secured to shaft 33, and an arm 45 of a bell crank secured to shaft 35. Another arm 47 of the bell crank is connected through link 55 and lever 51 to a gear (not shown) within gear box 53. A worm (not shown) engaging the mentioned gear is driven by steering wheel 36, whereby a rotary motion of wheel 36 imparts pivotal motion to it and a linear motion to the links 55 and 41 and in turn a pivotal motion to arm 43, bell crank 45, 47, shafts 35, 33 and wheels 32 and 34 Accordingly, rotation of steering wheel 36 is effective to direct wheels 32 and 34.

According to a feature of the invention, a pair of outrigger wheels 38 and 40 are mounted at the ends of respective arms 42 and 44, each being pivotal about an oblique axis fixed in body 12. Suitable mechanism is provided for extending each of the outrigger wheels. It is to be understood that each such mechanism is entirely similar to the other and for simplicity only one is described in detail herein, it being understood that the other is entirely similar in structure and operation to the one described.

Outrigger arm 42 is pivoted about a shaft 46 mounted in body 12 and is adapted to be positioned at either of its extremities by a hydraulic device including a cylinder 48 pivotally connected to body 12 at 50 and a piston (not shown) within cylinder 48 attached to a connecting rod 52 which in turn is pivotally connected to arm 42 at a point removed from shaft 46. Application of hydraulic fluid under pressure to cylinder 48 is effective in moving the piston and connecting rod 52 with respect to cylinder 48 to extend arm 42 and wheel 38. Control means hereinafter set forth and described are provided for controlling movement of arm 42. The axis of shaft 46 supporting wheel 38 is in a longitudinal vertical plane and is oblique so that wheel 38 in retracted position clears the floor or other supporting surface and so that in extended position it assumes a lower level than wheel 32 whereby wheel 32 is raised above the floor.

Arm 42 is provided with a cam 54 at the end thereof for engagement with a steering lever arm 56, pivotal at 58 about shaft 33 and adapted to engage the steering linkage of wheels 32 and 34. Extension of outrigger wheel 38 is therefore effective to turn wheels 32 and 34 by virtue of the engagement of cam 54, lever arm 56, and the steering linkage. It is to be observed that the turning of the dirigible wheels in response to extension of outrigger wheel 38 is automatic and that turning of wheels 32 and 34 in another direction by the operator's manipulation of steering wheel 36 is impossible when the outrigger wheel is extended. It is also to be observed that the axis of wheel 38 in extended position is coincident with wheel 34 whereby the wheels are parallel and only rolling motion thereof is obtained and sliding motion is avoided.

A suitable latch mechanism 62 is provided for selectively locking drive wheels 20 and 22 and axle 24 in forward position. Latch mechanism 62 is actuable by the truck operator to release and permit pivotal movement of wheels 20 and 22 and axle 24. Control means facilitating orderly and sequential extension of an outrigger wheel and pivotal movement of drive wheels 20 and 22 is described at length hereinbelow.

As clearly shown in Figures 3 and 4 of the drawings, mast 18 is tiltable by a mast tilting cylinder 64 and rod 66 from a vertical position as shown in these figures to any position intermediate to firstly, a fore position wherein the mast is parallel to a line 18f shown in Figure 4 and secondly, to an aft position wherein the mast is parallel to a line 18a also shown in Figure 4. Rod 66 is multipartite and includes a portion connected to a piston (not shown) within cylinder 64 and another portion connected to mast 18 by a ball joint 67 and having a transverse opening 69 for receiving a ball 71 securely disposed between a pair of lugs 73 and 75 by a bolt 77 passing through the lugs, ball and rod tightened by a nut 79 threaded on one end. Cylinder 64 is provided with hydraulic ports 81 and 83 at respective ends for applying hydraulic fluid to respective sides of the piston within cylinder 64 in a conventional manner.

Cylinder 64 is secured to a mounting bracket 68 by a rod 85 extending from cylinder 64 and attached to bracket 68 by a ball joint 60 similar to ball joint 67. Joint 60 includes a ball 59 received in an opening 61 in rod 85, a pair of spaced lugs 93 and 95 between which ball 59 is secured by a bolt 97 passing through the lugs and ball, and a nut 63 threadedly engaging the end of bolt 97 for securing the entire joint assembly.

It is to be observed that the ball joints 60 and 67 employed for mounting cylinder 64 between mast 18 and bracket 68, facilitate relative angular movement between the mast and the truck body in any direction without unusual strain on any components of the truck. Accordingly, tilting of the mast fore and aft for manipulating a load as is necessary or tilting of the truck body about a longitudinal axis as hereinafter described is accommodated by the ball joints without adverse effects.

Bracket 68 is selectively secured or released by latch mechanism 62 having a latch 70 at the end thereof for engagement with a notch 72 in a latch head 74. A hydraulic piston-cylinder apparatus 76 is provided for selectively retracting head 74 to release latch 70 and to permit pivotal movement of wheels 20 and 22 and parts pivotal therewith. A suitable spring 78 shown in Figure 3 is provided for urging head 74 outwardly from cylinder 76.

Figure 2:
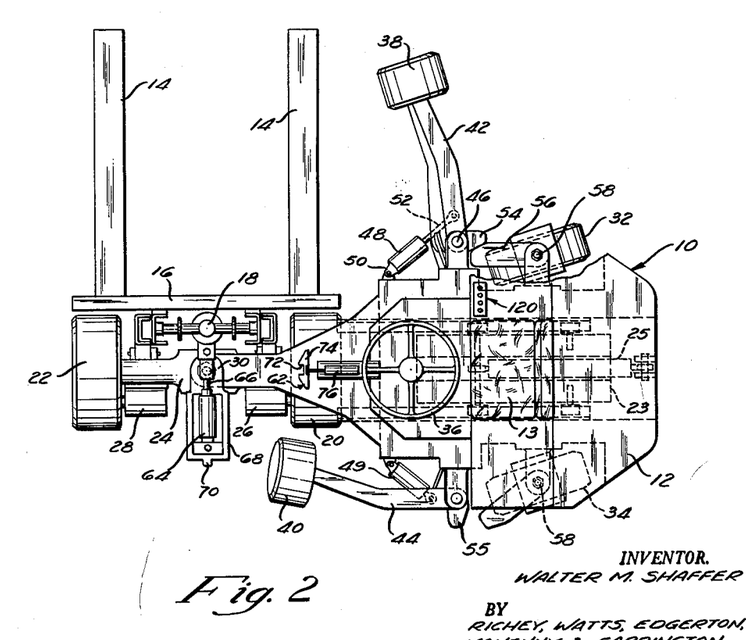
Figure 2 is a plan view of the truck with its carriage at 90 degrees from forward position and its right outrigger wheel extended.

In accordance with another feature of the invention, a counterweight 23 is provided as shown in Figures 1, 2, and 3 of the drawings. Counterweight 23 is slidable to a forward position along the longitudinal axis of the truck to provide increased traction to the drive wheels of the truck when operating without load and is slidable to a rearward position for providing increased stability to the truck particularly at times when the drive wheels are pivoted 90 degrees with respect to their normal straight ahead position.

Figure 7:
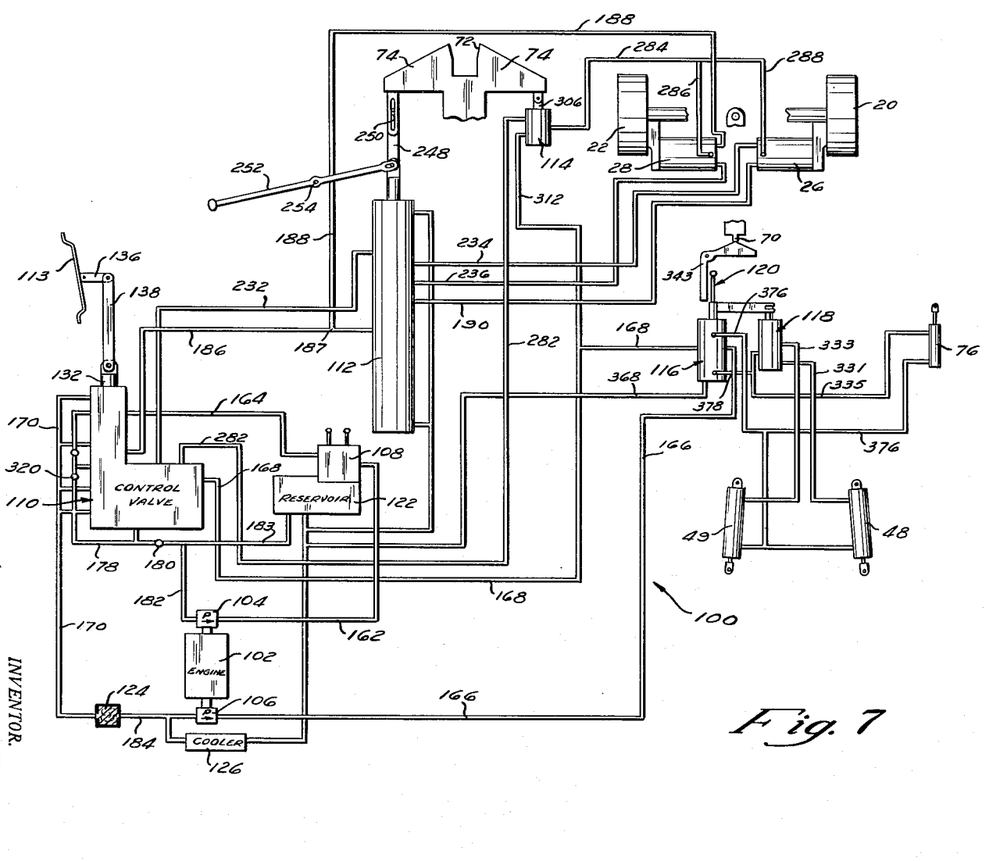
Figure 7 illustrates schematically the hydraulic control system of this invention as applied to the present lift truck.

Referring now to Figure 7 of the drawings showing the hydraulic control system 100 for controlling the speed and direction of movement of the various truck components, 102 represents a prime mover such as an internal combustion engine for driving a large constant displacement pump 104 and a small constant displacement pump 106. The pumps 104 and 106 are effective to apply fluid under pressure to the truck hoist and tilt cylinders under control of hoist and tilt valves in a box 108 and to motors 26 and 28, latch cylinder 76, and outrigger cylinders 48 and 49 under the control of a drive control valve 110, driving phase valve 112, selector valve 114, outrigger control valve 116 and outrigger selector valve 118.

As explained more fully hereinbelow, drive control valve 110 under manual selection, controls the volume and direction of fluid from pumps 104 and 106 applied to motors 26 and 28. This valve receives fluid from each of the pumps and either applied the entire volume to the motors 26 and 28 or applies only a proportion thereof to the motors while recirculating the remaining proportion, depending upon desired operation of the truck motors. Additional features of valve 110 automatically control the displacement of motors 26 and 28 under various conditions of truck operation to provide appropriate driving torque or braking effect in the circumstances wherein the truck drives the motors.

Driving phase valve 112 is interposed in the path of fluid flow from valve 110 to motors 26 and 28 for selectively applying the fluid to the motors in one of three possible circuits under the manual control of the truck operator through a pedal control lever 113. In a parallel-same circuit arrangement, fluid is applied to the motor inlets from one line and is discharged from the motors to another return line. In a series-same circuit arrangement, fluid is applied to the inlet of a first motor, is discharged from the outlet of the first motor to the inlet of the second motor and discharged to a return line from the outlet of the second motor. In a series-opposing circuit, fluid is applied to the inlet of a first motor, is discharged from the outlet of the first motor to the outlet of the second motor and discharged from the inlet of the second motor to the return line. It is to be noted that in any position of valve 112, valve 110 is operable to apply fluid in forward or reverse directions whereby the motors of the truck may be driven in parallel-forward, parallel-reverse, series-forward, series-reverse, and series-opposite with respective motors operable in forward and reverse directions to provide six operating conditions of the motors.

Selector valve 114 is actuable by the drive axle latch head 74 for applying fluid to the drive motors for maintaining the drive motors at maximum displacement during series operation thereof as explained more fully hereinbelow while outrigger control valve 116 is responsive to manual actuation to provide hydraulic fluid pressure to outrigger cylinders selected by outrigger selector valve 118 to extend the appropriate outrigger arm and wheel as also more fully explained hereinbelow. Valves 116 and 118 are actuable to extend appropriate outrigger arms or to retract the same as automatically determined by safety apparatus and linkages shown at 120 whereby the outrigger cylinders 48 and 49 may receive fluid from the pumps only in the forward position of the truck drive wheels.

The hydraulic system is provided with an oil reservoir 122 for providing a reserve supply of hydraulic fluid, with a filter 124 for removing foreign matter from the fluid and with a cooler 126 for removing heat engendered by molecular and other friction in the fluid system.

Figure 8:
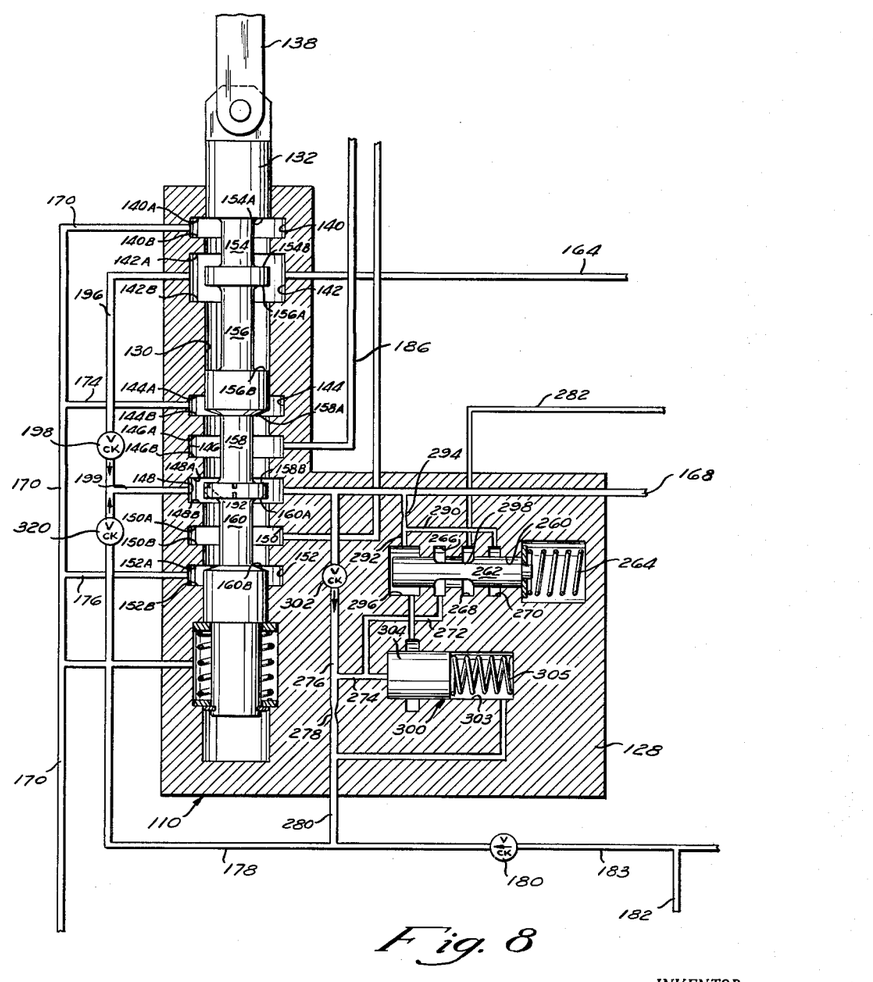
Figure 8 illustrates in cross-section a driving control valve of the hydraulic control system of Figure 7 and being positioned for complete recirculation of hydraulic fluid.

For effecting appropriate fluid application to the truck motors from the pumps 104 and 106, as shown in Figure 8, valve 110 comprises a housing 128 having a bore 130 therein for receiving a spool type plunger 132 reciprocable in the bore by the action of pedal 113 operable through a linkage including an arm 136 and a connecting link 138.

Bore 130 is provided with a plurality of radial ports 140, 142, 144, 146, 148, 150 and 152, having respective annular shoulders 140A, 140B; 142A, 142B; 144A, 144B; 146A, 146B; 148A, 148B; 150A, 150B and 152A, 152B and plunger 132 is necked down along portions 154, 156, 158 and 160 having respective shoulders 154A, 154B; 156A, 156B; 158A, 158B and 160A, 160B engageable with shoulders of bore 130 to confine and direct fluid in and between certain ports of the valve.

Fluid discharged from the output of pumps 104 and 106 is applied to respective ports 142 and 148 through respective channels including lines 162, valve box 108 and line 164 on the one hand and line 166, valve 116 and line 168 on the other hand. In the position of plunger 132 as shown in Figure 8 of the drawings, all of the fluid discharged from the respective pumps is recirculated back to the inputs of the pumps through respective ports 140, 144 and 152 through lines 170, 174, 176 and 178, check valve 180 and line 182 to pump 104 and through filter 124 and line 184 to pump 106. The movable valve element in check valve 180 is biased by a spring not shown whereby a pressure of 10 to 15 pounds per square inch is required to produce flow therethrough. Accordingly, the return flow of fluid to the motor inlets builds up to such a pressure on the inlet to pump 106 and oil cooler 126. The volume of oil flow through the cooler is the volume which the flow through back pressure check valve 180 is short of the supply requirement of pump 104. The fluid flowing through cooler 126 passes into reservoir 122 and therefrom into inlet of pump 104 through a line 183 and line 182.

Figure 8A:
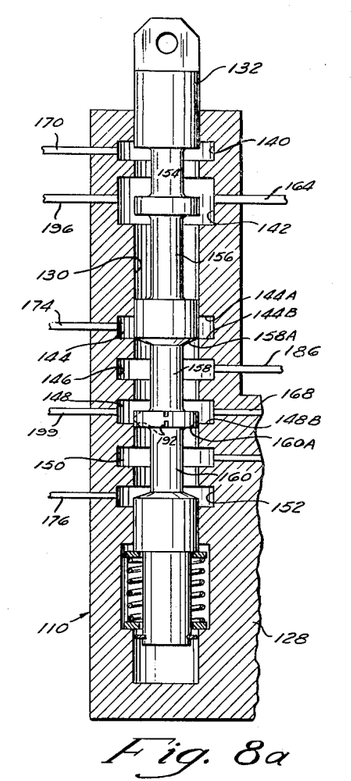
Figure 8a illustrates in cross section a part of the driving control valve shown in Figure 8 and positioned for forward "creeping" movement of the truck.

In another position of plunger 132, as shown in Figure 8a, motors 26 and 28 are driven for "creeping" movement of the truck. Fluid discharged from pump 104 continues to be recirculated as hereinabove described but a proportion of fluid discharged from pump 106 and entering port 148 is applied to the motors through port 146, line 186, line 188 and through driving phase valve 112 and line 190 since complete recirculation of pump 106 is prevented. Shoulder 158A of plunger 132 engages shoulder 144B to block fluid from port 144 and shoulder 160A engages shoulder 148B. Diagonal grooves 192 as shown more clearly in Figure 8c of an enlarged portion of plunger 132 allow a limited flow of fluid from port 148 into port 152 for recirculation to the pumps along necked down portion 160, whereby the motors 26 and 28 receive the remaining relatively low volume of fluid and accordingly drive the truck slowly at a "creeping" speed.

Figure 8B:
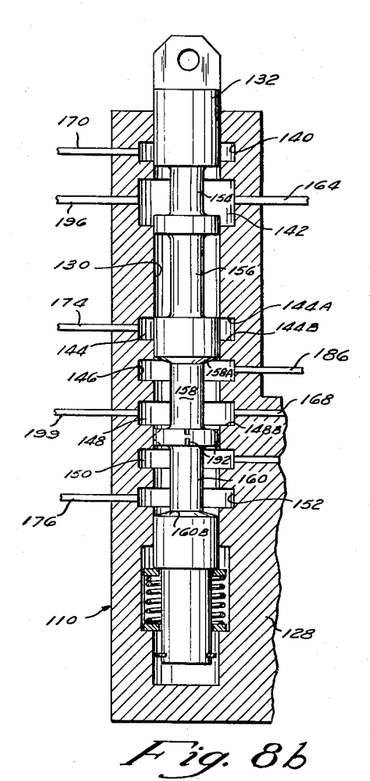
Figure 8b illustrates the driving control valve shown in Figures 8 and 8a and positioned for operation of the truck motors at full capacity.
Figure 8C:
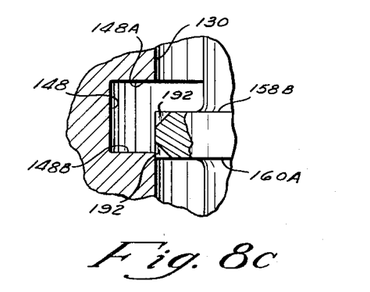
Figure 8c illustrates in detail the grooved shoulders of part of the plunger employed in the driving control valve of Figures 8, 8a and 8b.

In still another position of plunger 132, as shown in Figure 8b of the drawings, the full volume of pumps 104 and 106 is applied to motors 26 and 28. In this position of plunger 132 grooves 192 are blocked by the engagement of the outer peripheral extremity of the plunger 132 with the portion of bore 130 between ports 148 and 150 and shoulder 154A on plunger 132 engages shoulder 140B to prevent the access of fluid to port 140 and therefore to direct the output of pump 104 from port 142 into port 148 through a line 196, a check valve 198 and a line 199. Fluid so discharged into port 148 is combined with fluid from pump 106 also discharged into port 148 and is discharged into port 146 along necked down portion 158 to be applied to the motors 26 and 28 as before.

It is to be observed that driving control valve 110 is reversible whereby plunger 132 is positionable to provide reverse flow of fluid for "creeping" and full drive of the motors. For reverse "creeping" movement, fluid from pump 104 is recirculated to its input through the lines and ports hereinabove described with respect to neutral position, since ports 140 and 142 communicate with each other and with return line 170. Shoulder 160B, however, engages shoulder 152A to block flow to port 152 and shoulder 158B engages a shoulder 148A to restrict flow from port 148 to port 144 through grooves 192. Accordingly, remaining fluid is forced through port 150 to be applied in a direction reverse from that previously described. For full speed operation in the reverse direction, plunger 132 is withdrawn until shoulder 154B engages shoulder 142A to prevent return flow from pump 104 through port 140 and thereby to combine this output with the output of pump 106 through check valve 198 as before. The outer periphery of plunger 132 engages the portion of bore between ports 146 and 148 to prevent recirculation past grooves 192 and through port 144.

Figure 9:
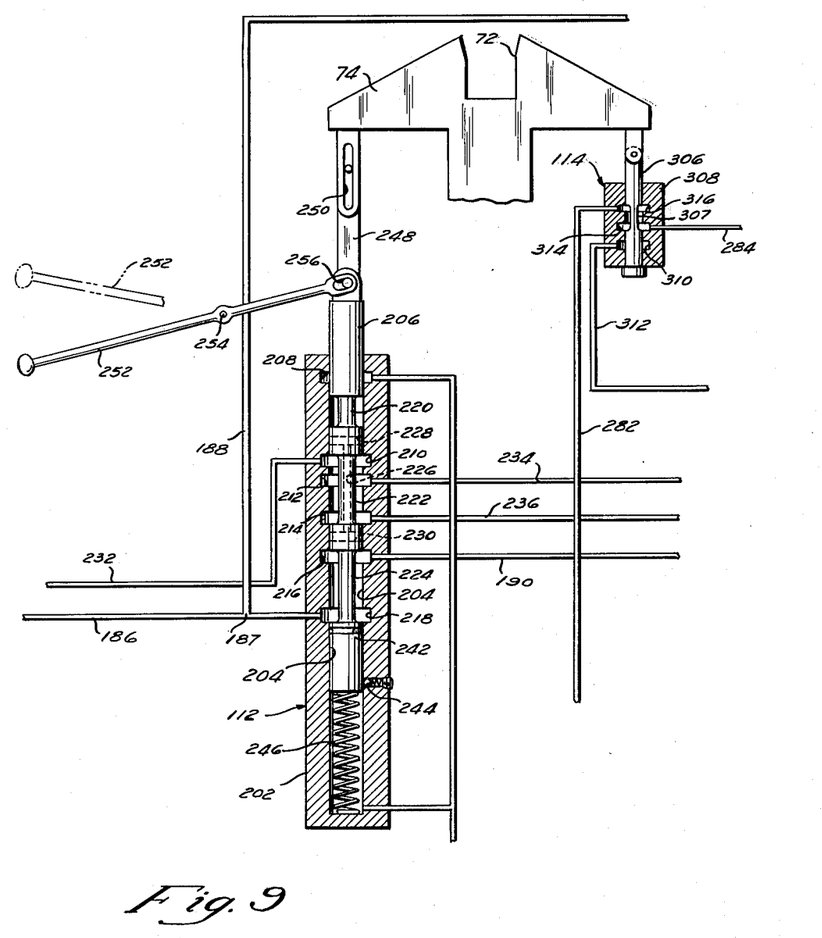
Figure 9 illustrates a driving phase valve positioned for full parallel application of fluid to the truck drive motors, coupled to the carriage latch mechanism and to a motor displacement selector valve.

As mentioned hereinabove, driving phase valve 112 is positionable for effecting operation of motors 26 and 28 in parallel, series-same and series-opposing drive. As shown more clearly in Figure 9, this valve comprises a body portion 202 with an axial bore 204 for receiving a plunger 206 slidable therealong. Bore 204 is provided with a plurality of axially spaced enlargements forming ports 208, 210, 212, 214, 216 and 218 and plunger 206 is provided with axially spaced reduced portions 220, 222, 224 and an axial bore 226 communicating with respective transverse bores 228 and 230 for effecting communication between selective ports along bore 204. Line 186 is in direct communication with port 218 and return line 232 communicates directly with port 210. Ports 212 and 214 communicate through respective lines 234 and 236 with the respective outlets of motors 26 and 28 while line 190 provides communication between port 216 and the inlet of motor 26. Plunger 206 is provided with annular groove 242 for receiving a spring biased ball detent 244 for retaining the plunger 206 in one position once it is adjusted, against the force of spring 246 which continuously urges the plunger manually in an outward direction. In the position of plunger 206 as shown in Figure 9, fluid is applied from valve 110 through line 186 to a T junction 187 from which it flows to the forward inlet of motor 28 through line 188 and to the forward inlet of motor 26 through port 218, bore 204 along reduced portion 224 of plunger 206, and line 190. Fluid is returned to valve 110 from the motors through outlet lines 234 and 236 into respective ports 212 and 214, through a portion of bore 204 along reduced portion 222 of plunger 206, through port 210 and return line 232. In this position of plunger 206, fluid is applied to the respective motor inlets in a parallel circuit arrangement in the same direction inasmuch as it is simultaneously applied to the motor inlets.

Figure 9A:
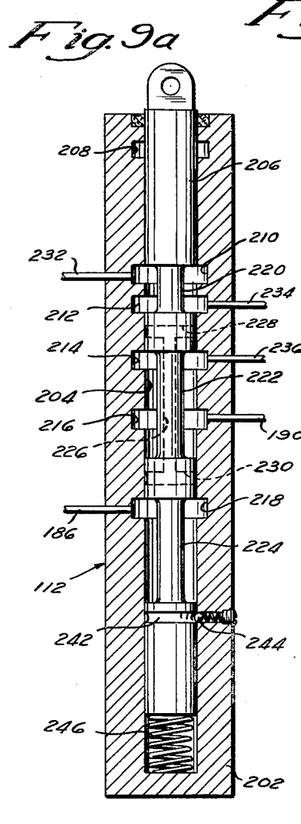
Figure 9a illustrates the driving phase valve shown in Figure 9 and positioned for series-same operations of the truck motors.

In another position of plunger 206 as shown in Figure 9a, series operation of motors 26 and 28 is effected whereby fluid is supplied from valve 110 to port 218 through line 186 and to forward inlet of motor 28 through line 188. No fluid flow exists in port 218 since in this position of the plunger there is no outlet for this port. Fluid flowing through motor 28 is discharged through the outlet thereof into port 214 where it flows through bore 204 along reduced portion 222 of plunger 206 and into port 216 through line 190 into the forward inlet of motor 26. Fluid traversing motor 26 is discharged from the forward outlet thereof to port 212 through line 234, through bore 204, along reduced portion 220 and into port 210 to be returned to valve 110 thorugh line 232. In this position of plunger 206, the same fluid flows successively through the motors 26 and 28 in the forward direction whereby a series hydraulic circuit is formed for driving the motors in a forward direction, and plunger 206 is held by ball 244 in groove 242.

Figure 9B:
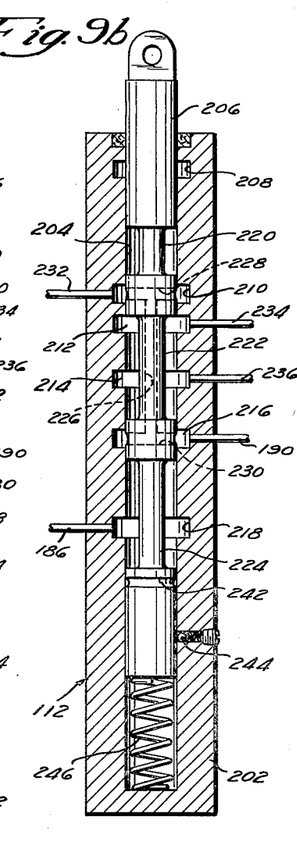
Figure 9b illustrates the driving phase valve shown in Figure 9 and positioned for series-opposite operation of the truck motors.
Figure 10:
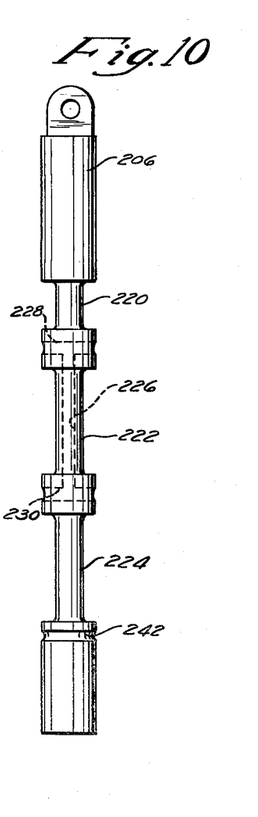
Figure 10 illustrates in detail the plunger of the driving phase valve.
Figure 11:
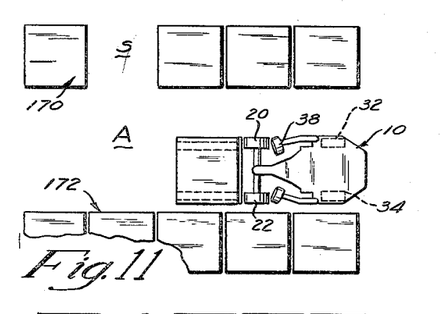
Figure 11 illustrates a loaded truck approaching a station along an aisle of stock preparatory to depositing the load.
Figure 12:
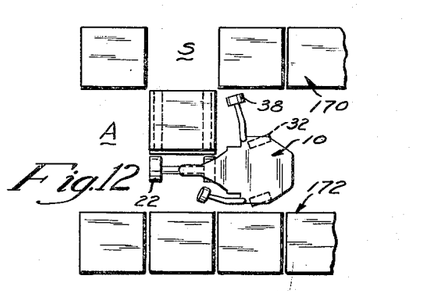
Figure 12 illustrates a loaded truck with its outrigger wheel extended for stability and its drive wheels aimed at a receiving space preparatory to a deposit of a load.
Figure 13:
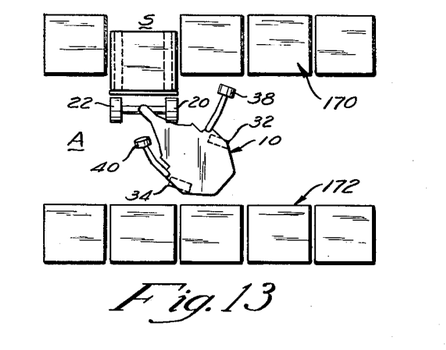
Figure 13 illustrates the position of the truck in an intermediate position during its unloading operation.
Figure 14:
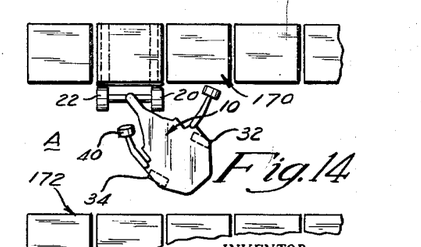
Figure 14 illustrates the position of the truck in its unloading position.

In a third position of plunger 206 as shown in Figure 9b, fluid is applied to port 218 through line 186 and to the forward inlet of motor 28 through line 188. Since in this position no outlet exists for fluid in port 218, there is no flow therethrough. Fluid applied to the inlet of motor 28 is again discharged from the outlet thereof to port 214 through line 236 and thereafter flows through bore 204 along reduced portion 222 into port 212 to be applied to the forward outlet of motor 26 through line 234. Fluid in motor 26 is discharged from the forward inlet thereof to port 216 through line 190 and thereafter flows successively through transverse bore 230, bore 226, transverse bore 228, into port 210 and back to valve 110 through line 232. In this position of the plunger 206, the same fluid is successively applied to motors 26 and 28 in mutually reverse directions whereby one motor is driven in a forward direction and the other in a reverse direction. As may be understood, a mutually opposite rotation of motors 26 and 28 is effective to impart a pivotal motion to axle 24 to direct the wheels and load carriage of the truck, as may be desired. It is also to be understood that pivotal movement of axle 24 may be effected in either direction since, as explained hereinabove, valve 110 is positionable to direct the flow of fluid therefrom in either direction. Accordingly, the motors are operable in series-opposite drive in either direction to provide pivotal movement in either direction.

For providing the truck operator with greater freedom of manual control of the several variable truck controls, the positioning of driving phase valve plunger 206 for series-opposite operation of motors 26 and 28 is made automatic by the withdrawal of drive axle head 74 which is connected to the plunger 206 through a rod 248. Withdrawal movement of drive axle latch 74 is effective to slide plunger 206 to series opposite position where it is held by the latch. When the latch goes forward, spring 246 automatically extends plunger 206 to its parallel same position. As hereinabove explained, for series same operation of the motors plunger 206 is manually positioned in bore 204 so that ball detent 244 engages groove 242. Movement to and from series-same position of the plunger is manual rather than automatic and plunger 206 is retained in such position by ball detent 244 whereby the operator's hand need not be on lever 252 during movement into or away from the stack. A slip joint 250 between drive axle head 74 and rod 248 renders the return latching movement of head 74 ineffective by itself or in other words in the absence of other influences to return plunger 206 to its initial or outer position. A manually operated mechanical linkage including an arm 252 pivoted at 254 and coupled to plunger 206 at 256 enables the truck operator to stop the rotative movement of axle 24 at any point between its angular limits. This is necessary because in normal warehousing it may occur that stacks are disposed at various angles with respect to a normal warehouse aisle. An angle other than 90 degrees may also be desirable to compensate for longitudinal misplacement of the truck in the aisle.

As explained in detail hereinbelow, motors 26 and 28 are provided with pressure-responsive plungers for adjusting the displacement of the motors and as another feature of the invention provision is made for automatically adjusting the pressure against these plungers according to the torque demand of the motors. To this end, a cylindrical bore 260 is provided in a portion of the housing of valve 110 for receiving a slidable plunger 262 urged in one axial direction by a spring 264 which may be adjusted by means not shown. Bore 260 is provided with annular enlargements 266, 268 and 270, communicating, respectively, with return line 178 through lines 272, 274, 276, restriction 278 and line 280; with motor displacement control plungers through line 282, selector valve 114, lines 284, 286, 288 and with high pressure line 168 through lines 290 and 292 and restriction 294. A further enlargement 296 of bore 260 is provided at one axial end thereof for a purpose to be made clear. Plunger 262 is reduced along a portion 298 and in one position thereof, as shown in Figure 8 of the drawings, establishes communication between enlargements 266 and 268 whereby the fluid pressure existing in reservoir 122 is applied to the displacement control plungers of motors 26 and 28 through line 183, check valve 180, lines 178 and 280, restriction 278, lines 276, 274 and 272, portion 298 of plunger 262, line 282, valve 114, lines 284, 286 and 288. If the torque requirement of motors 26 and 28 is low, the pressure in enlarged portion 296 of cylindrical bore 260 is correspondingly low since the resistance to flow in line 168 is low due to low back pressure whereby plunger 262 remains positioned as shown in Figure 8. Accordingly, the motors 26 and 28 are conditioned for operation at minimum displacement. In response to increased pressure in enlargement 296 occurring by reason of increased torque demand and correspondingly increased pressure in line 168, plunger 262 is moved axially to the right as shown in Figure 8 against the base of spring 264 whereby communication between enlargements 266 and 268 is interrupted and communication between enlargements 268 and 270 is established along reduced portion 298 of plunger 262, effecting application of high pressure to displacement control plungers in motors 26 and 28 through line 168, restriction 294, lines 292 and 290, enlargement 270, reduced portion 298 of plunger 262, enlargement 268, line 282, valve 114 and lines 284, 286 and 288, displacing the control plungers of the respective motors 26 and 28, conditioning the same for high displacement operation. It is noted that this feature is completely automatic and without manual attention.

As still another feature of this invention, provision is made for enabling reverse application of fluid to the motors 26 and 28 while the truck is traveling at high speed. In the absence of special displacement control for the motors under these circumstances, the displacement would go to a maximum, imposing severe stresses on the motors and generating considerable heat in the fluid from molecular friction, rendering the same susceptible to breakdown and damage due to starving of sufficient oil supply to the motors acting as pumps. To avoid such undesirable effects, a relief flow sensing valve 300 is provided for operation under these circumstances for relieving the pressure in enlargement 296 of bore 260 allowing return of plunger 262 under the bias of spring 264 whereby low reservoir pressure is applied to the motor displacement plungers.

In accomplishing this end, a pressure relief valve 302 is provided between port 148 and line 178 whereby excessive pressure built up in line 168 by the motors 26 and 28 acting as pumps is relieved. When the flow through relief valve 302 approaches the volume produced by the motors acting as pumps at minimum displacement, sufficient pressure is built up in lines 276 and 274 by resistance to flow imposed by restriction 278 to effect a movement of a piston 304 disposed in a bore 303 to the right as shown in Figure 8 of the drawings against the force of a biasing spring 305, in that the pressure differential existing across restriction 278 is applied to the respective ends of bore 303 through line 274 and line 281. Such movement of piston 304 establishes communication between enlargement 296 and line 274 to relieve the high pressure thereof and to allow return of plunger 260 to the left as seen in Figure 8. As already explained, under these circumstances reduced pressure is applied to the motor displacement control plungers to reduce the displacement thereof. Accordingly, a lower volume of fluid is pumped by the motors acting as pumps.

Also operative by the movement of drive axle latch head 74 is selector valve 114 having a slidable plunger 306 having a reduced portion 307 received in a valve housing 308 for applying either high or low fluid pressure to the displacement plungers of motors 26 and 28. Housing 308 is provided with a first annular recess 310 communicating with the high pressure line 168 through a high pressure branch line 312, a second annular recess 314 communicating with respective displacement plungers of the motors, and a third annular recess 316 communicating with line 282. Inasmuch as it is both necessary and desirable to have the motors 26 and 28 at maximum displacement during series circuit operation regardless of torque requirement, provision is made for automatically establishing this condition. To this end, plunger 306 is connected to latch head 74 whereby retraction of latch head 74 places plunger 306 in a position to establish communication between high pressure line 312 and lines 286 and 288 through recess 310, reduced portion 307, recess 314 and line 284. By this feature of invention, motors 26 and 28 are effective to deliver substantially constant and equal output torques effecting good control thereof.

With the truck traveling at a speed greater than that which would be produced by the drive originating with engine 102, as may occur when the engine throttle is released and the truck is coasting, the engine quickly reduces its speed slowing the pumping action of pumps 104 and 106 and the motors 26 and 28 are driven by the wheels 20 and 22 whereby they act as pumps rather than as motors. As such pumps, the motors 26 and 28 draw fluid into their respective inlets at a rate faster than may be supplied by the pumps 104 and 106 at such a reduced engine speed. As a feature of this invention, cavitation resulting from suction at the motor inlets under these circumstances is avoided by supplementing the flow of fluid to the motor inlets through a check valve 320 receiving fluid from line 170 and delivering the same to the appropriate motor inlet port of bore 130. Check valve 180 under these circumstances maintains a pressurized supply.

As still another feature of this invention, provision is made for extending the respective outrigger arms and wheels by outrigger cylinders 48 and 49 and safety means for preventing accidental retraction of an outrigger arm and wheel in any position of the wheels 20 and 22 in any direction but that for forward movement of the truck. Fluid is applied to the respective outrigger cylinders through four-way valve 116 communicating with the output of pump 106 through line 166 on the one hand and with valve 118, latch cylinder 76 and outrigger cylinders 48 and 49 on the other hand.

Figure 15:
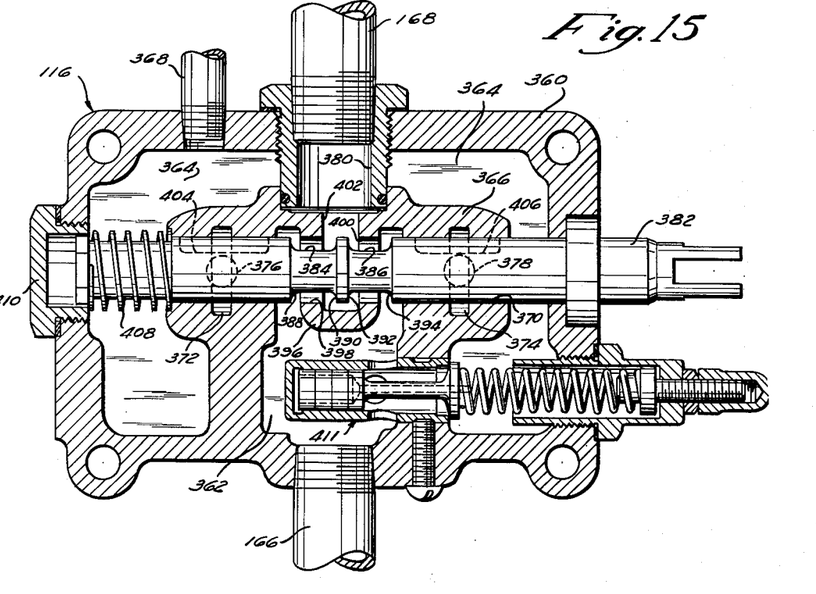
Figure 15 illustrates a cross-sectional view of a four-way valve forming a part of this invention.

As shown more clearly in Figure 15, valve 116 comprises a casing 360 which is separated into a high pressure region 362 and a low pressure region 364 by walls of a valve body member 366. High pressure region 362 is in communication with the outlet of pump 106 through line 166 and low pressure region 364 is in communication with the reservoir 122 through a line 368.

Valve body 366 within casing 360 is provided with a bore 370 extending therethrough with which a pair of cavities 372 and 374 are in communication. These cavities are also in communication with respective lines 376 and 378 extending to the outrigger and latch hydraulic control system. An outlet port 380 for receiving fluid from the high pressure region in a certain position of a plunger 382 reciprocable in bore 370 communicates with line 168. Plunger 382 is reduced along portions 384 and 386 having respective opposed shoulders 388, 390 and 392, 394 for engaging surfaces of an enclosure 396 having apertures 398 and 400. Port 380 is in direct communication with enclosure 396 through a channel 402 extending therebetween.

Plunger 382 is provided with a first axial recess 404 extending interiorly of the plunger and terminating at longitudinally spaced points along the plunger and a second axial recess 406 similarly extending interiorly of the plunger and terminating at longitudinally spaced points along the plunger.

It is observed that plunger 382 is movable inwardly of the casing 360 against the force of a spring 408 extending between a plug 410 in a wall of casing 360 and the end of the plunger and having coils of rectangular cross section for restricting inward axial movement of the plunger.

In the position of plunger 382 as shown in Figure 15, fluid is admitted into high pressure region 362 and passed to port 380 through openings 398 and 400 in enclosure 396, along reduced portions 384 and 386 of plunger 382 and through channel 402. Each of the cavities 372 and 374 fails to receive fluid from the high pressure region since neither recesses 404 and 406 nor any other means provide communication therewith. This is referred to as the high pressure carry-over feature of the valve 116.

In an inner position of plunger 382, shoulder 390 engages opening 398, shoulder 394 engages opening 400 to block the flow into port 380 while simultaneously communication is provided between low pressure region 364 and cavity 372 through recess 404 and communication is provided between high pressure region 362 and cavity 374 through recess 406 whereby high pressure is applied to line 378 and low pressure is applied to line 376.

In an outward position of plunger 382, low pressure is applied to line 378 and high pressure to line 376 by virtue of communication established between these lines and respective low and high pressure regions of valve 116 through cavity 374 and recess 406 on the one hand and cavity 372 and recess 404 on the other hand. In this outward position of the plunger, communication between high pressure region 362 and port 380 is blocked by shoulders 388 and 392 engaging respective openings 398 and 400 of enclosure 396.

A safety valve shown at 411 is provided but forms no feature of this invention and accordingly, is not described in detail.

From the foregoing description, it is seen that plunger 382 is selectively positionable in three positions, the first position a neutral position to provide high pressure to valve 110 while blocking other communication with the high pressure line 166, the second position being an inner position to block high pressure to valve 110 and provide high pressure to first ends of one outrigger cylinder and a latch cylinder and low pressure to the other ends and the third position being an outer position to block high pressure to valve 110 and provide high pressure to second ends of one outrigger cylinder and a latch cylinder and low pressure to the other ends thereof.

Figure 17:
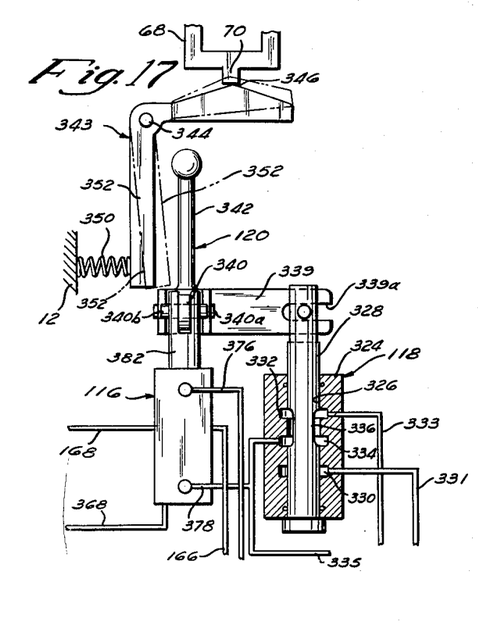
Figure 17 illustrates in detail the outrigger selector valve forming a component in the system of Figure 7.
Figure 18:
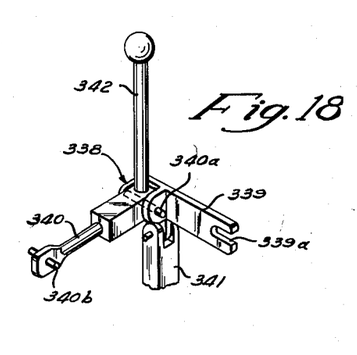
Figure 18 illustrates in perspective the hand lever and linkage for manipulating the valve shown in Figure 17.

Referring now to Figures 17 and 18 for a detailed description of selector valve 118, 324 represents the valve housing having a bore 326 receiving a slidable plunger 328 and having spaced annular recesses 330, 332 and 334 communicating, respectively, with first ends of outrigger cylinders 48 and 49 and line 378 extending to valve 116 through lines 331, 333 and 335. Plunger 328 which is manually actuable in a manner described hereinbelow is provided with a reduced portion 336 whereby communication between recesses 330 and 334, or between recesses 332 and 334 may be effected. The opposite ends of outrigger cylinders 48 and 49 communicate with another outlet 376 of valve 116 and respective ends of a latch cylinder 76 communicate with recess 334 and outlet line 376 of valve 116.

Manipulation of plunger 382 of valve 116 is effected by a linkage 338 including arms 339 and 340 pivotally coupled, respectively, to plungers 328 and 382 through a slot 339a and a pin 340b. Arm 339 is pivotally supported by a post 341 allowing pivotal movement of the arm in one plane and a pin 340a extending through arm 340 and ears of arm 339 permits pivotal motion of arm 340 in a plane perpendicular to the first mentioned plane. A lever arm 342 rigidly secured to arm 340 is manually manipulable to the left and right or forwardly and rearwardly to pivot either of the arms to actuate either of the plungers 328 or 382.

A bell crank 343 is pivotally mounted at 344 of the truck body and is provided with a nose portion 346 along one arm thereof for engagement with a latch 70 and a spring 350 having one end fixed to the truck body and engaging the other arm 352 of bell crank 343 at the other end, urges the nose 346 against latch 70. In one position of bell crank 343 as shown in full in Figure 17, latch 70 is pivoted away from the bell crank and arm 352 thereof is interposed in the normal path of plunger 382 of valve 116, preventing outward extension thereof, while in another position of bell crank 343, nose 346 is in engagement with latch 70 and plunger 382 is free to be extended axially.

Movement of control arm 342 forwardly, as seen in Figure 17, is effective to withdraw plunger 382 from the arm body of valve 116 somewhat and therefore to direct fluid through line 378 into valve 118 at recess 334. The fluid flows from recess 334 into either recess 330 or 332 depending upon the position of plunger 328 as manipulated by the operator. In the position of plunger 328 as shown, fluid passes along reduced portion 336 of the plunger through recess 332, through line 333 into the head end of cylinder 49 to effect extension of the left outrigger arm and wheel. In an inner position of plunger 328, recess 330 and line 331 receive fluid to apply the same to the head end of cylinder 48 to extend the right outrigger arm and wheel.

Retraction of either outrigger arm and wheel is effected by application of fluid to the appropriate rod end of cylinder 48 or 49 through line 376 which is in communication with valve 116 and the removal of fluid pressure from the head end of the cylinder by a withdrawal of plunger 382.

It is to be observed that latch cylinder 76 receives fluid at its rod end simultaneously with the application of fluid to the head end of either outrigger cylinder and the head end of latch cylinder 76 receives fluid simultaneously with the application of fluid to the rod end of either outrigger cylinder. Accordingly, the pivotal axle 24 and carriage 16 are unlatched or latched as the outriggers are extended or retracted. It is also to be observed that withdrawal of plunger 382 from the body of valve 116 is possible only when wheels 20 and 22 are directed for straight forward movement since latch 70 is effective to position bell crank 343 to allow withdrawal of plunger 382 only in this condition.

Figure 16:
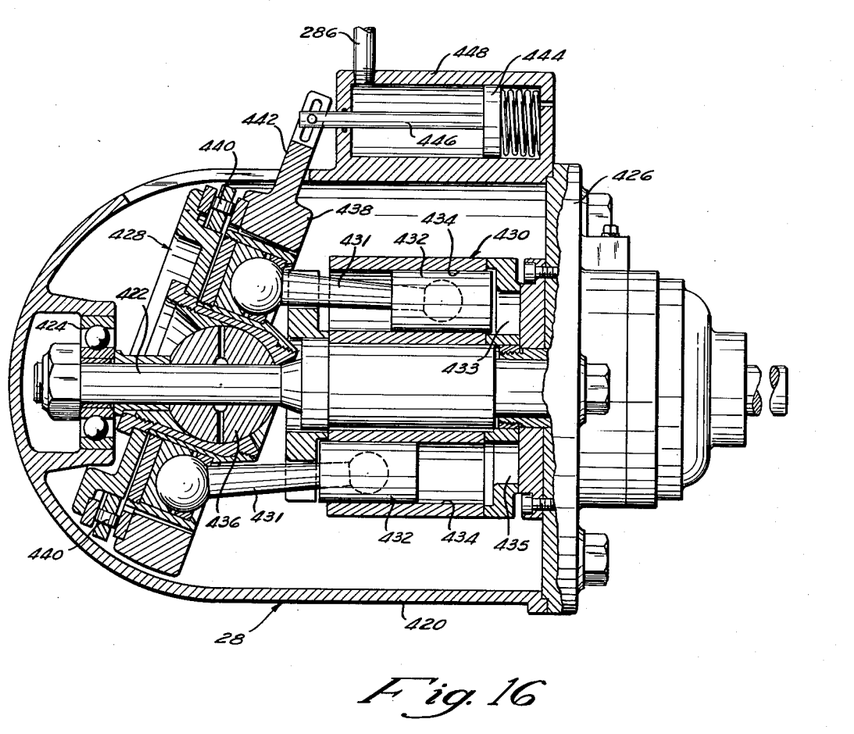
Figure 16 illustrates a cross-sectional view of a fluid motor of the type forming a part of this invention.

The driving motors 26 and 28 of this invention comprise fluid devices as shown more particularly in Figure 16 of the drawings and as disclosed and claimed in U.S. Patent No. 1,362,040 to C. R. Pratt granted December 14, 1920. Motors 26 and 28 are identical in structure. Accordingly, only motor 28 and its relation to other parts of the system will be described. Motor 28 includes a housing 420 in which is mounted a rotative assembly including a shaft 422 journaled at one end in a bearing 424 and at the other end in a head 426, a transmission disk shown generally at 428, a rotor barrel 430 and a plurality of pistons 432 reciprocable in cylinders 434 in barrel 430 and connected to rods 431 journaled in disk 428. Transmission disk 428 is adjustably tiltable about a spherical bearing 436 rotatable with the described rotative assembly by a ring 438 surrounding portions of the disk and bearing against the same through bearings 440. A suitable inlet passage 433 and an outlet passage 435 provide communication with cylinders 434 through different arcuate portions of their travel.

Ring 438 is journaled in suitable bearings and is tiltable by a yoke 442 connected to a displacement piston 444 through a rod 446 reciprocable in a displacement cylinder 448. Tilting of disk 428 is effective to vary the stroke of pistons 432 in cylinders 434 during rotation of the mentioned assembly whereby the displacement of the pistons is also varied. Accordingly, fluid pressure applied against piston 444 through line 286 is effective to vary the displacement of the motors by varying the angle of disk 428.

In the operation of motor 28 fluid pressure is applied through inlet 433 to the pistons 432 at the inward extreme of their strokes whereby the same react against inclined disk 428 through rods 431 and cause rotation of the same. Upon sufficient rotation the inlet fluid is blocked from access to these pistons and outlet 435 communicates with the cylinders of these pistons whereby the fluid is driven to the pump outlet by pistons urged inwardly by the rotation of the disk 428.

In motors 26 and 28, the ratios of pump displacement versus motor displacement are infinite between the torque requirements at minimum displacement and approximately 75 per centum of maximum pressure and the torque requirements at maximum displacement of the motors and approximately 75 per centum of maximum pressure. The motors are at constant displacement at torque requirements above and below these respective torque requirements. That is, as torque demand on the motor increases from a minimum value to a predetermined value, the pressure progressively increases to a value equal to approximately 75 per centum of the maximum value, while the motor displacement remains at a minimum, then as the torque requirement increases to a second predetermined value, the displacement of the motor then varies according to torque requirement while a pressure equal to 75 per centum of maximum is applied until a maximum displacement is reached and then the pressure progressively increases from 75 per centum of maximum to 100 per centum of maximum while the motor is at maximum displacement.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. An industrial truck comprising a frame having a pair of transversely spaced dirigible wheels for supporting said frame at one end, a pair of outrigger arms at opposed sides of said frame and each arm being pivotally mounted at one end to said frame, each arm having an outrigger wheel mounted on the free end thereof, power means for selectively pivoting one of said outrigger arms to an extended position laterally of said frame, and means including a cam connected to each of said arms for automatically aligning a dirigible wheel co-axially to the extended outrigger wheel.

2. An industrial truck comprising a frame having a pair of transversely spaced dirigible wheels for supporting said frame at one end, a pair of outrigger arms at opposed sides of said frame and each arm being pivotal about an axis fixed and oblique to said frame, each arm having an outrigger wheel mounted on the free end thereof, power means for selectively pivoting either of said arms to an extended position laterally of said frame, and means including a cam connected to each of said arms for aligning a dirigible wheel remote from said extended outrigger co-axially to the extended outrigger wheel.

3. An industrial truck comprising a frame having a pair of transversely spaced dirigible wheels for supporting said frame at one end, a pair of outrigger arms at opposed sides of said frame and each arm being pivotal about an axis fixed with respect to said frame, an outrigger wheel mounted on the free end of each of said arms, the lower extremity of the dirigible wheel being spaced from a plane coincident with the lower extremities of the other dirigible wheel and said outrigger wheel when in extended position, power means for selectively pivoting either of said arms, and means including a cam connected to each of said arms for aligning the remote dirigible wheel co-axially with the extended outrigger wheel.

4. A lift truck comprising a frame having a relatively wide rear portion supporting a power unit, steering wheels carried beneath said rear frame portion, said frame having a relatively narrow centrally disposed forward portion, a transverse drive axle pivotally mounted at the outer end of said narrow forward portion of the frame to provide a space at each side of the lift truck between the drive axle and the rear portion of the frame, an outrigger arm pivotally mounted at each side of the lift truck on the rear portion of the frame, an outrigger wheel mounted on the free outer end of the outrigger arm, means to swing the outrigger arm and the wheel carried thereby from a storage position in said space at the side of the lift truck to a laterally extended position at the side of the lift truck, means operatively connecting the outrigger arm and the steering wheels to align one of the steering wheels with an outrigger wheel when the outrigger is extended.

5. A lift truck comprising a frame having a relatively wide rear portion supporting a power unit, steering wheels carried beneath said rear frame portion, linkage means connecting the steering wheels, said frame having a relatively narrow centrally disposed forward portion, a transverse drive axle pivotally mounted on a vertical pivot at the outer end of said narrow forward portion of the frame to provide a storage space at each side of the lift truck between the drive axle and the rear portion of the frame, an outrigger arm pivotally mounted at each side of the lift truck on the rear portion of the frame, an outrigger wheel mounted on the free outer end of the outrigger arm, hydraulic cylinder means to swing the outrigger arm and the wheel carried thereby from a position in said storage space to a laterally extended position at the side of the lift truck, a member carried by the outrigger arm being connected to said steering wheel linkage means to align one of the steering wheels with the extended outrigger wheel to increase the lift truck stability for sharp turns.

6. A lift truck comprising a frame having a relatively wide rear portion supporting a power unit, steering wheels carried beneath said rear frame portion, link means connecting the steering wheels for joint turning movement, said frame having a relatively narrow centrally disposed forward portion, a transverse drive axle pivotally mounted at the outer end of said narrow forward portion of the frame to provide a space at each side of the lift truck between the drive axle and the rear portion of the frame, an outrigger arm pivotally mounted at each side of the lift truck on the rear portion of the frame, said pivot mounting for the outrigger arm being inclined rearwardly, an outrigger wheel mounted on the free outer end of the outrigger arm, means to swing the outrigger arm and the wheel carried thereby from an elevated storage position in said space at the side of the lift truck to a lower laterally extended position at the side of the lift truck, means connecting the outrigger arm and said link means for the steering wheels to align one of the steering wheels with an outrigger wheel when the outrigger is extended.

7. A lift truck comprising a frame having a relatively wide rear portion supporting a power unit, hydraulic pump means driven by said power unit, dirigible wheels beneath said relatively wide rear portion of the lift truck, a steering wheel arranged above the frame for turning said dirigible wheels to guide the lift truck for forward drive, said frame having a narrow elongated neck projecting forwardly at the center thereof, a drive axle pivotally connected at the outer end portion of said forwardly extending neck to provide a space between the ends of the drive axle and said dirigible wheels at the rear of the lift truck, an outrigger arm pivotally mounted on the frame adjacent the dirigible wheels, an outrigger wheel carried at the outer end of each outrigger arm, hydraulic cylinder means interposed between the outrigger arm and the frame to swing the outrigger from an extended position laterally of the lift truck into a storage position in said space between the drive axle and the dirigible wheels, means operatively connecting said outrigger arms and said dirigible wheels to swing a dirigible wheel into alignment with an outrigger wheel when an outrigger is extended, hydraulic traction motor means carried by said drive axle and valve and conduit means connecting said hydraulic pump means to said traction motor means to turn the drive axle from a position transversely of the lift truck through said space to a position aligned with the central axis of the lift truck.

8. A lift truck comprising a frame having a relatively wide rear portion supporting a power unit, hydraulic pump means driven by said power unit, dirigible wheels beneath said relatively wide rear portion of the lift truck, a steering wheel for turning said dirigible wheels to guide the lift truck for normal forward drive, said frame having a narrow elongated neck projecting forwardly at the center thereof, a drive axle pivotally mounted on a vertical pivot at the outer end portion of said forwardly extending neck to provide a storage space between the ends of the drive axle and the dirigible wheels at the rear of the lift truck, an outrigger arm pivotally mounted on the frame adjacent the dirigible wheels, an outrigger wheel carried at the outer end of each outrigger arm, hydraulic cylinder means interposed between the outrigger arm and the frame to swing the outrigger from a lowered extended position laterally of the lift truck into an elevated position in said storage space between the drive axle and the dirigible wheels, means connecting one outrigger arm and said dirigible wheels to swing a dirigible wheel on the opposite side of the truck into alignment with said one outrigger wheel when said one outrigger is extended, traction motor means carried by said drive axle to turn the drive axle from a position transversely of the lift truck through said storage space to a position aligned with the central axis of the lift truck after said one outrigger is extended.

9. A lift truck comprising a frame having a relatively wide rear portion supporting a power unit, dirigible wheels beneath said relatively wide rear portion of the lift truck, a steering wheel accessible to the lift truck operator for turning said dirigible wheels to guide the lift truck for normal forward drive, said frame having a narrow elongated portion projecting forwardly at the center thereof, a drive axle pivotally connected at the outer end of said narrow portion to provide a storage space between the ends of the drive axle and the dirigible wheels at the rear of the lift truck, an outrigger arm pivotally mounted on the frame on a rearwardly inclined pivot adjacent the dirigible wheels, an outrigger wheel carried at the outer end of each outrigger arm, hydraulic cylinder means interposed between the outrigger arm and the frame to swing the outrigger from an extended lowered position laterally of the lift truck into a storage position in said space between the drive axle and the steering wheels, said outrigger in extended position being effective to raise the adjacent dirigible wheel from the supporting surface, means operatively connecting said outrigger arms and said dirigible wheels to swing the opposite dirigible wheel into alignment with the extended outrigger wheel, traction motor means carried by said drive axle, means to reversely rotate said traction motor means to turn the drive axle from a position transversely of the lift truck through said storage space to a position aligned with the central axis of the lift truck.

References Cited in the file of this patent

UNITED STATES PATENTS

| | | |
|---|---|---|
| 2,461,116 | Jeffrey | Feb. 8, 1949 |
| 2,614,644 | Gustafson | Oct. 21, 1952 |
| 2,618,396 | Belt | Nov. 18, 1952 |
| 2,709,017 | Ulinski | May 24, 1955 |
| 2,750,204 | Ohrmann | June 12, 1956 |
| 2,767,995 | Stout | Oct. 23, 1956 |
| 2,774,436 | Ferris | Dec. 18, 1956 |
| 2,789,648 | Huffman | Apr. 23, 1957 |
| 2,799,418 | Haldimann | July 16, 1957 |
| 2,818,706 | Wright | Jan. 7, 1958 |